United States Patent [19]
Forchino

[11] Patent Number: 6,112,678
[45] Date of Patent: Sep. 5, 2000

[54] PLANTING MACHINE WITH LIFTING MEANS FOR LIFTING AND CARRYING PLANTING UNITS WITH EVEN DISTRIBUTION OF UNITS WEIGHT ALONG THE MACHINE

[76] Inventor: Elvio Antonio Forchino, Paso de los Andes 967, Las Rosas - Santa Fe 2520, Argentina

[21] Appl. No.: 09/407,986

[22] Filed: Sep. 29, 1999

[51] Int. Cl.[7] ................................... A01B 59/042
[52] U.S. Cl. ............................ 111/52; 172/680
[58] Field of Search ................... 111/52, 53, 54, 111/55, 59, 69; 172/677, 679, 680; 280/186

[56] References Cited

U.S. PATENT DOCUMENTS

| | | | |
|---|---|---|---|
| 3,391,663 | 7/1968 | Cagle et al. | 111/52 X |
| 3,543,704 | 12/1970 | Hansen et al. | 111/52 |
| 3,679,224 | 7/1972 | Hatcher | 111/52 X |
| 4,744,362 | 5/1988 | Gründler | 128/305 |
| 4,844,175 | 7/1989 | Nations | 172/680 |
| 5,404,958 | 4/1995 | Weiss | 172/680 X |
| 5,921,325 | 7/1999 | Meek et al. | 111/52 X |

*Primary Examiner*—Christopher J. Novosad
*Attorney, Agent, or Firm*—Jacobson, Price, Holman & Stern, PLLC

[57] ABSTRACT

A planting machine having a lifting arrangement for lifting and carrying planting units, with the weight of the units uniformly and evenly distributed on the machine when the units are traveling in an inoperative mode, the planting machine including a lifting tower upwardly extending in a sloped plane for lifting the planting units up to the transportation inoperative position mode, along the sloped plane defined by the lifting tower, the center of gravity of the planting units lying in a position wherein the weight of the planting units is symmetrically distributed relative to the wheels of the rolling transportation chassis; with the spacing distance between the planting units, in the planting position, being capable of being modified as a function of the desired distance between furrows, without the wheels of the transportation chassis interfering with the hoppers of the planting units and hindering the movement of the planting units.

10 Claims, 2 Drawing Sheets

PLANTING MACHINE WITH LIFTING MEANS FOR LIFTING AND CARRYING PLANTING UNITS WITH EVEN DISTRIBUTION OF UNITS WEIGHT ALONG THE MACHINE

BACKGROUND OF THE INVENTION

1. Field of the Invention

The present invention relates to a planting machine embodying a novel arrangement for lifting and carrying planting units, with the weight of the units uniformly and evenly distributed on the machine during an inoperative transportation of the machine, the machine comprising a chassis for carrying the planting units in an operative position and a rolling transportation chassis including lifting means and rotation means for lifting and rotating the chassis carrying the planting units to place the same in an inoperative position.

More particularly, the present invention relates to a new planting machine, the special arrangement of which for lifting and carrying the planting units allows to transport assemblies of planting units on said transportation chassis, such that the weight of said assemblies of planting units is evenly distributed upon said chassis, particularly relative to the wheels of said transportation chassis. Moreover, the planting machine of the present invention allows to place assemblies of planting units in a planting position such that said planting units are movable relative to each other in a simple way, as a function of the chosen required planting distance.

2. Description of the Prior Art

As it is known in the art, planting machines have planting units coupled to rolling transportation chassis and arranged in assemblies of planting units covering a width of several meters of the ground to be cultivated. Said covered width is suitable for the planting operation, but is unsuitable for moving said planting machines on roads, highways, as well as for the parking thereof in store houses or for crossing arrow areas.

Two solutions have been implemented in order to solve this drawback caused by the width of said planting machines. On the one hand, planting machines have been developed with planting units, e.g., a total of twelve bodies, that are assembled, in assemblies of four bodies each, i.e., a central assembly and two side assemblies, and said side assemblies are folded over at 90° relative to the central assembly by means of particularly set up gears. The three assemblies of bodies have to be lifted for sufficiently spacing the same from the ground, at a height enough to allow the transportation thereof. Under these conditions, by folding over the side assemblies of said planting units, a decrease in the width of the machine is obtained.

Other planting machines have been developed that are provided with gears for lifting the assemblies of planting units over the related transportation chassis. once lifted, the assemblies are rotated 90° relative to a center line of the machine whereby the planting machine can be moved along narrow roads or can cross narrow areas without drawbacks, because the width of said planting machine is practically given by the total width of the rolling transportation chassis.

Moreover, this type of planting machines have some features that cause additional drawbacks notwithstanding of the solutions found for carrying the planting assemblies on the transportation chassis. Actually, in both the first and second cases mentioned in the prior art, that shall be briefly called "foldable planting machines" and "lifting and rotary planting machines" respectively, in the planting position, the wheels of the transportation chassis and eventually also the planting wheels are interposed between the crop-containing hoppers of the planting units. Under these conditions, in order to change the planting distance, i.e., the distances between furrows, the wheels of the transportation chassis and/or the planting wheels have to be moved, which is an operation that considerably increases the work and the time for getting the planting machine ready. In addition, particularly in the second case of "lifting and rotary planting machines", once the assembly of planting units is lifted and rotated through 90° over the transportation chassis, the weight of said assembly is asymmetrically distributed relative to the wheels of the transportation chassis. As it is apparent, this poor distribution of the load upon the transportation chassis causes unbalancing of said chassis and further unduly overloading of one of the two wheels of the chassis. This asymmetrical load is due to the fact that the lifting of the assembly of planting units is done along a vertical axis symmetrically located relative to the extension of the planting assemblies, but not relative to the distribution of the weight of said assemblies.

While some lifting and rotation machines have been manufactured in order to make the center of gravity of the carrier chassis for the planting units coincide with the center of gravity of the transportation chassis, the effect of coincidence of the centers of gravity is useful at the time of transportation, but in the planting position, i.e., with the carrier chassis lowered, the hoppers of the planting units interfere with the wheels of the transportation chassis.

Thus, it would be advantageous to have a system of lifting and transportating planting assemblies whereby in the planting position the planting units do not interfere with the transportation wheels and, in the transportation position, the weight of the chassis with the planting units is evenly distributed on the machine.

It would be therefore desirable to find an original and effective solution to the drawbacks of the prior art planting machines, by simultaneously solving the two above mentioned problems.

SUMMARY OF THE INVENTION.

It is therefore an object of the present invention to provide a planting machine having a novel arrangement for lifting and carrying planting units that allows to place said planting units in a planting position such that the hoppers for loading the crops of said planting units are sufficiently shifted from the wheels of the transportation chassis, thus allowing to unrelate the eventual movement of said planting units relative to the position occupied by the wheels of said transportation chassis, in order to change the planting distance as a function of the desired distance between the furrows.

Another object of the present invention is to provide a planting machine for lifting said planting units over a rolling transportation chassis and distributing the weight of said planting units symmetrically relative to the wheels of said rolling transportation chassis, thus achieving to keep said transportation chassis balanced, and evenly loading said wheels, further preserving consequently the useful life thereof.

It is still another object of the present invention to provide planting machine comprising a chassis carrying a plurality of planting units, a rolling transportations chassis including lifting means and rotation means connected to the chassis carrying the planting units, the lifting means comprising a lifting tower mounted on a rotary plate, said lifting tower defining a sloped plane relative to said rotary plate and said transportation chassis, the chassis carrying the planting units being connected to said slopped lifting tower by means of at least one supporting unit that is movable coupled to and along said tower, said supporting unit being connected to actuating means capable of lifting the supporting unit together with said chassis carrying the planting bodies.

It is even another object of the invention to provide a planting machine comprising a chassis carrying a plurality of planting units, a rolling transportation chassis including lifting means and rotating means connected to the chassis carrying the planting units, the lifting means comprising a rotary lifting tower defining a sloped plane relative to said transportation chassis, the chassis carrying the planting units being movably connected to said slopped lifting tower through actuating means capable of lifting the chassis carrying the planting units along the lifting tower.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Figure 1:
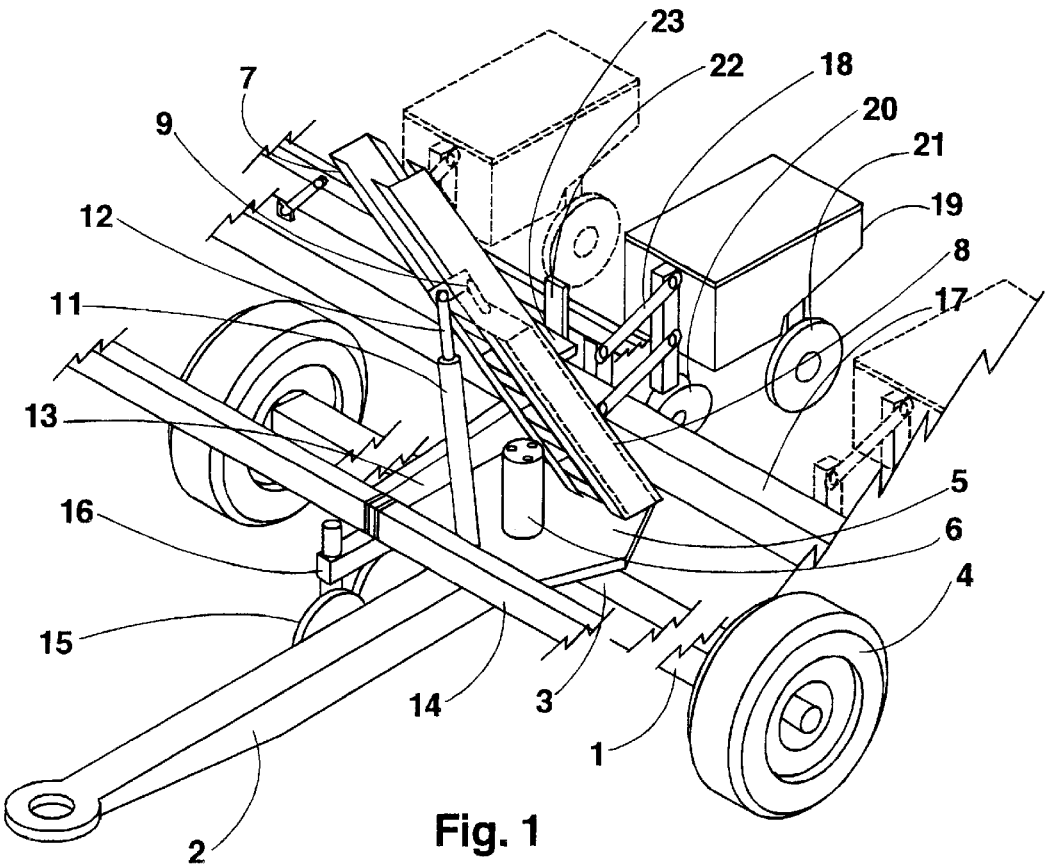
FIG. 1 is a perspective view of the planting machine of the present invention.

Now, referring to the drawings the planting machine of the present invention has been illustrated showing a single planting unit in solid lines and part of the remaining ones in dashed lines, but it will be apparent to any one skilled in the art that many planting units may be used in the practice, each unit being like the one represented by the illustrated planting unit.

FIG. 1 shows a crossbar 1 which, together with a tow bar 2, form a transportation chassis. Said cross bar includes a rotation shaft (not shown) with wheels 4.

Said tow bar can be coupled to a traction vehicle for carrying the planting machine. A rotary plate 5 including an upright bush 6 is arranged in a middle position 3 of said cross bar 3. Said upright bush 6 houses a rotation shaft (not shown) which is secured to the middle position of bar 1. A lifting tower 7 also projects from said rotary plate, extending in a sloped plane which, as shall be described herein below in detail, comprises longitudinal guides having of substantial "U" cross section and facing each other, between which a supporting unit or sliding carriage 8 is arranged. However, tower 7 can be built in any other appropriate shape, in which a supporting unit or carriage 8 can be mounted, either slidably or rollingly on any type of suitable guides, which shall be easily conceived by those skilled in the art.

An end of a hydraulic cylinder 11 is secured to rotary plate 5. The hydraulic cylinder rod 12 is connected to said carriage 8 by means of a support 9. Said carriage 8 is connected to a carrier or transportation chassis for carrying planting units, comprising a frame made up of a forward bar 14 and a rear bar 17 joined by means of crosspieces 13, said forward and rear bars extending from end to end along the planting machine. Said bar 14 is in turn coupled to assemblies of disks 15 for opening furrows, through support means 16 of said disks 15. The number of disks assemblies correspond to the number of planting units, and are arranged in the extension of bar 14.

Moreover, bar 17 is connected to a hopper 19 by means of articulated arms 18, which can be simple, as shown, or double, as it is conventional. Beneath hopper 19, assemblies of disks 20 are arranged for closing furrows and wheels 21 for packing down the furrowed ground. Identical articulated arms 18 are arranged in the extension of said bar, corresponding to each planting unit, connected to respective hoppers 19, disks 20 and wheels 21, as shown. A supporting plate 22 is secured to said bar 17. A supporting arm 23 projects from the supporting plate 22. The supporting arm 23 is connected to said carriage 8 which slides on lifting tower 7. While arm 23 is only shown connected to carriage 8, this construction could be modified, e.g., connecting also plate 22, to the extent that the necessary robustness thus dictates.

A brief description of the operation of the planting machine of the invention that shall be made before describing the remaining figures.

When the planting machine is in the planting position, as shown in FIG. 1, the hydraulic cylinder 11 is inactive and thus keeps the planting unit defined by the assemblies of disks 15 and 20, the wheel 21 and the hopper 19 is in operative conditions. Particularly, the assemblies of disks 15 and 20 and the wheel 21 are thus in contact with the ground to be sowed. As clearly shown, when it is necessary to change the distance between planting furrows, said hoppers 19 of the planting units can be freely moved on bars 14 and 17, without the planting machine chassis wheels 2 being interposed in that movement. One of the drawbacks of the prior art planting machines is thus solved.

When the planting machine has to be placed in transportation position, i.e., lifted and 90° rotated relative to the transporting chassis, the hydraulic cylinder 11 is actuated. The hydraulic cylinder 11 actuates on the sliding carriage 8 and consequently in the carrier chassis of the planting unit. Said planting unit is then lifted parallely to the sloped plane defined by the lifting tower 7. It should be noted that the center of gravity of the assembly of planting units shall be defined according to the distribution of masses of the hopper and all elements that make up the planting units.

For clarity purposes in the drawings, the center of gravity has been illustrated in the geometrical center of the cross section of bar 17, said cross section being illustrated in a plane passing through the rotation axis of plate 5. Thus, when the planting units have been lifted and placed in the transportation or inoperative position, the center of gravity of the assembly or arrangement formed by the planting units coincides with the center of gravity of axis 1 which center of gravity has been illustrated in the rotation axis of rotary plate 5 for clarity purposes. Plate 5 is rotated by hydraulic cylinder 27 illustrated in FIG. 4. Of course, plate 5 may be rotated by any other suitable mechanism. Under these conditions the weight of the chassis carrying the planting units will be distributed symmetrically and uniformly relative to all wheels 4 of the transportation chassis of the planting machine.

Figure 2:
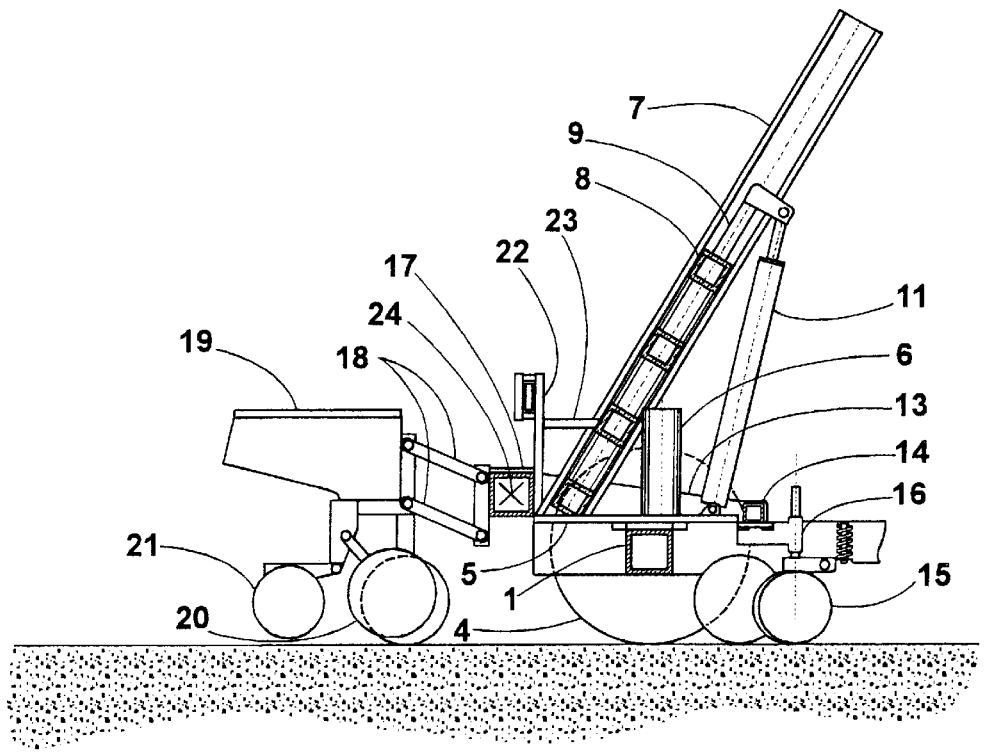
FIG. 2 is a side elevation view, partially in section, of the present invention in planting, operative, position.

As stated above, FIG. 2 shows the planting machine in the planting position wherein the location of the center of gravity is indicated with an "X" in a cross section of bar 17 and also indicated with reference number 24. In this planting position, the sets of disks 15 and 20 and the wheel 21 freely rest upon the ground to be cultivated. It can be appreciated that hoppers 19 of the planting units are located relative to the wheels 4 in such a way that the relative position of said planting units can be more freely changed as a function of the desired distance between furrows, without the wheels 4 hindering the movement of the planting units hoppers.

Figure 3:
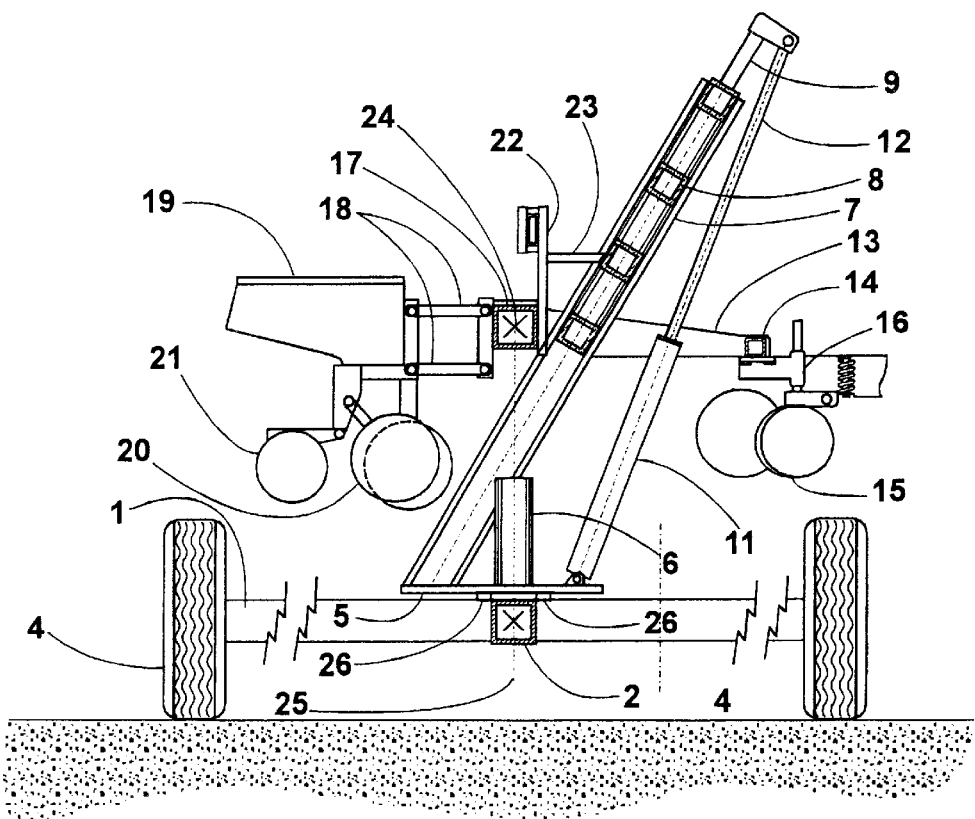
FIG. 3 is an elevation view, partially in section, of the present invention in transportation, inoperative, position.

FIG. 3 shows the planting machine in the transportation position, i.e., in the operative position with the planting unit lifted and 90° rotated on the transportation chassis. Hydraulic cylinder 11 is activated and consequently rod 12 is extended, thus positioning the planting unit in such a way that the center of gravity 24 of the assembly of planting units is located in a plane that coincide with the rotation axis of rotary plate 5. Dotted line 25 shows the new position of the center of gravity. The symmetrical distribution of the load upon wheels 4 is clearly appreciated in this transportation position.

Plate 5 rest upon bearings 26. These can be ball bearing, needle bearings or any type of bearing known that is suitable for the practical embodiment of the present invention.

Figure 4:
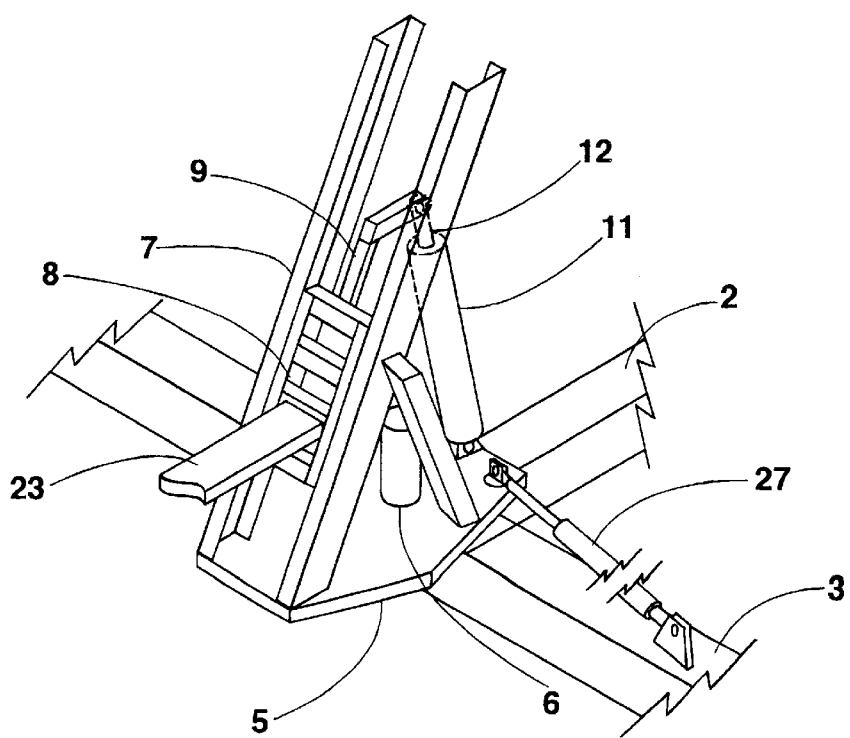
FIG. 4 is a detailed perspective view of a sliding carriage inside a lifting tower according to the present invention.

FIG. 4 shows a representative detail of the lifting tower 7 arranged on rotary plate 5. FIG. 4 shows "U" shaped facing guides, between which carriage 8 is slidably mounted. Carriage 8 comprises a simple structure having longitudinal and traverse bars of enough strength, for the intended purposes, which can include any type of skids or bearings for moving on tower 7. Support 9 is also shown with rod 12 of cylinder 11 and arm 23 (partially shown) being coupled to support 9.

It should be noted that FIG. 4 is only conceptually representative of the arrangement of carriage 8 in lifting tower 8, the extension and retraction movement of said carriage 8 and said tower 7 are, in the practice, substantially different from the proportions shown in this figure.

While preferred embodiments of the present invention have been illustrated and described, it will be obvious to those skilled in the art that various changes and modifications may be made therein without departing from the scope of the invention as defined in the appended claims.

What is claimed is:

1. A planting machine comprising:
   a chassis carrying a plurality of planting units,
   a rolling transportation chassis including lifting means and rotating means connected to the chassis carrying the planting units,
   the lifting means comprising a lifting tower mounted on a rotary plate, said lifting tower defining a sloped plane relative to said rotary plate and said rolling transportation chassis, the rolling transportation chassis carrying the planting units being connected to said lifting tower by means of at least one supporting unit that is movably coupled to and along said lifting tower, said at least one supporting unit being connected to actuating means capable of lifting the at least one supporting unit together with said rolling transportation chassis carrying the planting units.

2. The planting machine according to claim 1, wherein the rotary plate is rotatably coupled to the rolling transportation chassis by means of an upright bushing that houses a rotation shaft of said rotary plate, said rotation shaft being secured to said rolling transportation chassis.

3. The planting machine according to claim 1, wherein the lifting tower comprises two longitudinal guides each one having a substantially U-shaped cross-section and facing each other, the at least one supporting unit being movably housed along said two longitudinal guides.

4. The planting machine according to claim 3, wherein the at least one supporting unit includes a lifting carriage slidably mounted between said two longitudinal guides, said lifting carriage being coupled to said rolling transportation chassis carrying the planting units and said actuating means.

5. The planting machine according to claim 4, the actuating means comprises a hydraulic cylinder secured at one end to said rotary plate and at another opposite end to said lifting carriage.

6. A planting machine comprising:
   a chassis carrying a plurality of planting units,
   a rolling transportation chassis including lifting means and rotating means connected to the chassis carrying the planting units,
   the lifting means comprising a rotary lifting tower defining a sloped plane relative to said rolling transportation chassis, the rolling transportation chassis carrying the planting units being movably connected to said rotary lifting tower through actuating means capable of lifting the rolling transportation chassis carrying the planting units along the rotary lifting tower.

7. The planting machine according to claim 6, wherein the rotary lifting tower is mounted on a rotary plate rotatably coupled to the rolling transportation chassis by means of an upright bushing that houses a rotation shaft of said rotary plate, said rotation shaft being secured to said rolling transportation chassis.

8. The planting machine according to claim 6, wherein the rotary lifting tower comprises two longitudinal guides each one having a substantially U-shaped cross-section and facing each other, at least one supporting unit being movably housed along said two longitudinal guides.

9. The planting machine according to claim 8, wherein the at least one supporting unit includes a lifting carriage slidably mounted between said two longitudinal guides, said lifting carriage being coupled to said rolling transportation chassis carrying the planting units and said actuating means.

10. The planting machine according to claim 9, wherein the actuating means comprises a hydraulic cylinder having an end secured to said lifting carriage.

* * * * *